US006284866B1

(12) United States Patent
Schiavone

(10) Patent No.: US 6,284,866 B1
(45) Date of Patent: Sep. 4, 2001

(54) METHOD OF PREPARING MODIFIED POLYESTER BOTTLE RESINS

(75) Inventor: Robert Joseph Schiavone, Matthews, NC (US)

(73) Assignee: Wellman, Inc., Shrewsbury, NJ (US)

( * ) Notice: Subject to any disclaimer, the term of this patent is extended or adjusted under 35 U.S.C. 154(b) by 0 days.

(21) Appl. No.: 09/456,253

(22) Filed: Dec. 7, 1999

(51) Int. Cl.$^7$ .................................................. C08G 63/00
(52) U.S. Cl. ...................... 528/308.6; 528/272; 528/298; 528/301; 528/302; 528/307; 528/308; 528/503; 428/35.7; 428/36.92
(58) Field of Search ..................................... 528/272, 298, 528/301, 302, 307, 308, 308.6, 503; 428/35.7, 36.92

(56) References Cited

U.S. PATENT DOCUMENTS

| | | |
|---|---|---|
| 4,165,420 | 8/1979 | Rinehart . |
| 4,254,253 | 3/1981 | Brent, Jr. et al. . |
| 4,755,587 | 7/1988 | Rinehart . |
| 4,849,497 | 7/1989 | Scannapieco . |
| 4,876,326 | 10/1989 | Rinehart . |
| 4,977,196 | 12/1990 | Scannapieco . |
| 5,510,454 | 4/1996 | Stouffer et al. . |
| 5,523,382 | 6/1996 | Beavers et al. . |
| 5,532,333 | 7/1996 | Stouffer et al. . |
| 5,540,868 | 7/1996 | Stouffer et al. . |
| 5,556,675 | 9/1996 | Yamamoto et al. . |
| 5,571,584 | 11/1996 | Yamamoto et al. . |
| 5,633,018 | 5/1997 | Stouffer et al. . |
| 5,714,262 | 2/1998 | Stouffer et al. . |
| 5,728,347 | 3/1998 | Collette et al. . |
| 5,744,074 | 4/1998 | Stouffer et al. . |
| 5,759,656 | 6/1998 | Collette et al. . |
| 5,830,982 | 11/1998 | Stouffer et al. . |
| 5,851,612 | 12/1998 | Umeda et al. . |

FOREIGN PATENT DOCUMENTS

| | | |
|---|---|---|
| WO96/22319 A1 | 7/1996 | (WO) . |
| WO 96/30428 A1 | 10/1996 | (WO) . |

Primary Examiner—Samuel A. Acquah
(74) Attorney, Agent, or Firm—Summa & Allan, P.A.

(57) ABSTRACT

The present invention is a method of preparing a high molecular weight copolyester bottle resin that has excellent melt processing characteristics. The method includes the steps of reacting a diacid or diester component and a diol component to form modified polyethylene terephthalate, wherein diol component is present in excess of stoichiometric proportions. Together, the diacid or diester component and the diol component must include at least 7 percent comonomer. The remainder of the diacid component is terephthalic acid or dimethyl terephthalate and the remainder of the diol component is ethylene glycol. The modified polyethylene terephthalate is copolymerized in the melt phase to an intrinsic viscosity of between about 0.25 dl/g and 0.40 dl/g to thereby form a copolyester prepolymer. Thereafter the copolyester prepolymer is polymerized in the solid phase to form a high molecular weight bottle resin that has an intrinsic viscosity of at least about 0.70 dl/g, and a solid phase density of less than 1.413 g/cc.

23 Claims, 2 Drawing Sheets

Haze Point for Bottle Resin Produced from Low I.V. Prepolymer compared to Conventional Bottle Resin
(isophthalic acid and diethylene glycol comonomers)

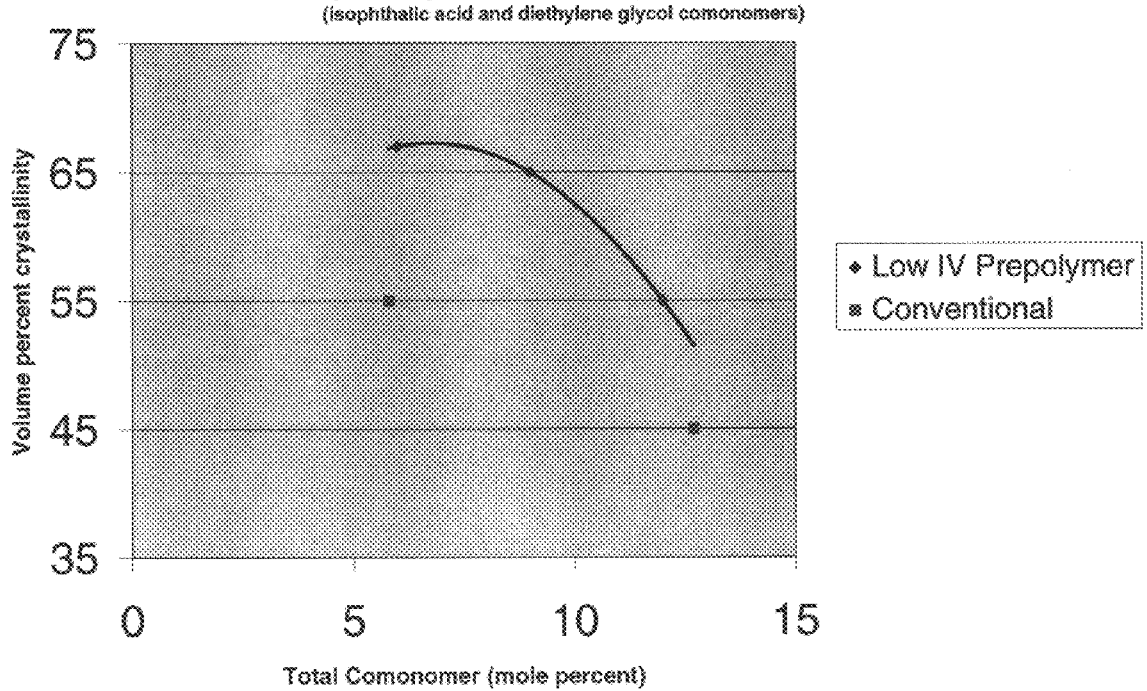

METHOD OF PREPARING MODIFIED POLYESTER BOTTLE RESINS

FIELD OF THE INVENTION

The present invention relates to polyester bottle resins and methods of preparing polyester bottle resins. In particular, the invention relates to methods of polymerizing modified polyesters in the solid phase to yield bottle resins.

BACKGROUND OF THE INVENTION

Polyester resins, polyethylene terephthalate (PET) and its copolyesters, are widely used to produce rigid packaging, such as two-liter soft drink containers. Polyester packages produced by stretch blow molding possess high strength and shatter resistance, and have excellent gas barrier and organoleptic properties as well. Consequently, such plastics have virtually replaced glass in packaging numerous consumer products (e.g., such as carbonated soft drinks, fruit juices, and peanut butter).

In conventional techniques of making bottle resin, polyethylene terephthalate or its copolyesters are polymerized in the melt phase to an intrinsic viscosity of about 0.6 deciliters per gram (dl/g). The polyethylene terephthalate is then polymerized in the solid phase to achieve a higher intrinsic viscosity that promotes bottle formation.

As will be understood by those having ordinary skill in the art, polyethylene terephthalate is typically converted into a container via a two-step process. First, an amorphous bottle preform is produced from bottle resin by melting the resin in an extruder and injection molding the molten polyester into a preform. Such a preform usually has an outside surface area that is at least an order of magnitude smaller than the outside surface of the final container. The preform is reheated to an orientation temperature that is typically 30° C. above the glass transition temperature. The reheated preform is then placed into a bottle mold and, by stretching and inflating with high-pressure air, formed into a bottle. Those of ordinary skill in the art will understand that any defect in the preform is typically transferred to the bottle. Accordingly, the quality of the injection-molded preform is critical to achieving commercially acceptable bottles.

Conventional polymerization techniques rely primarily on melt-phase polymerization to produce polyester resins that facilitate efficient preform molding. Melt phase polymerization, however, is relatively expensive as compared to solid state polymerization (SSP). In particular, melt-phase polymerization requires a higher capital investment than does solid state polymerization.

To reduce the costs associated with preparing bottle resins, techniques have been developed to emphasize polymerization in the solid phase rather than the melt phase. For example, there are several patents assigned to DuPont that disclose modified polyethylene terephthalate compositions and methods for preparing the same. See, e.g., U.S. Pat. Nos. 5,510,454; 5,532,333; 5,540,868; 5,633,018; 5,714,262; 5,744,074; and 5,830,982. These patents especially disclose polyethylene terephthalate compositions having large crystallite sizes.

For example, U.S. Pat. No. 5,510,454 describes modified and unmodified polyethylene terephthalate prepolymer having a degree of polymerization of about 5 to about 35 (ie., an intrinsic viscosity ranging between about 0.10 dl/g and 0.36 dl/g), an average apparent crystallite size of 9 nm or more, and a melting point of 270° C. or less. The related U.S. Pat. No. 5,714,262 further discloses a high molecular weight polyethylene terephthalate composition polymerized in the solid phase from a low molecular weight, large crystallite prepolymer, such as that disclosed by the '454 patent. Both the '454 patent and the '262 patent teach that polyethylene terephthalate can be modified by up to 10 mole percent comonomers—but preferably less than 5 mole percent—provided that the crystallization behavior of the polyester is substantially the same as unmodified polyethylene terephthalate.

Accordingly, these DuPont patents teach away from modified polyethylene terephthalate compositions that have substantially different crystallization behavior from those of "homopolymer" polyethylene terephthalate. This is critical because by embracing only polyesters that behave like homopolymer polyethylene terephthalate, the combined DuPont teachings yield high molecular weight copolyester resins that not only have large crystallite sizes, but also high crystallinity fraction. Polymer melt theory suggests that this combination causes high haze point temperatures. As will be understood by those of ordinary skill in the art, haze point is the temperature at which large, light scattering crystallites are present in the preform. This complicates the conventional processing of resins produced according to the DuPont teachings.

U.S. Pat. No. 4,165,420, which is assigned to Goodyear, discloses low molecular weight polyester prepolymer in the form of spherical beads that can be polymerized in the solid state to yield a high molecular weight resin. The prepolymer has an intrinsic viscosity of between about 0.1 dl/g and 0.35 dl/g. In accordance with this Goodyear patent, to achieve discrete spherical beads between 100 and 250 microns by employing either spray congealing or atomization requires that the solid state polymerization begin at an intrinsic viscosity of below 0.25 dl/g. The '420 patent also results in prepolymer having relatively large crystallite sizes.

Similarly, U.S. Pat. No. 4,755,587 and its continuation-in-part, U.S. Pat. No. 4,876,326, both of which are also assigned to Goodyear, disclose a method for producing high molecular weight polyester resins from low molecular weight prepolymers. In particular, the '587 patent discloses the solid state polymerization of polyester prepolymers in the form of porous pills. These prepolymers have an initial intrinsic viscosity between about 0.15 dl/g and 0.7 dl/g—preferably less than 0.3 dl/g—for a time sufficient to yield a high molecular weight polyester resin. The '587 patent also describes that a final intrinsic viscosity of at least 0.65 dl/g is desirable, and preferably an intrinsic viscosity of at least 0.7 dl/g. While the '587 patent discloses that the invention is applicable to virtually any polyester that can be solid state polymerized, it explains that the most common kind of polyesters to be solid state polymerized using the technique have about 75 mole percent of their acid component provided by aromatic dicarboxylic acids.

In general, the cited Goodyear patents disclose modified polyesters having both high and low molecular weight, as well as solid state polymerization methods that employ copolyester prepolymers. These patent disclosures, however, fail to teach the present method for preparing copolyester bottle resins that have excellent melt processing characteristics, specifically a low haze point temperature. In particular, these Goodyear patents teach away from using conventional pellets and instead employ very fine spherical beads or porous pills (i.e., less than 1 mm). For example, Goodyear's disclosed spray-congealing method produces spherical polyethylene terephthalate particles in the 100–200 nm range when the intrinsic viscosity is less than about 0.25 dl/g. Goodyear's relatively greater surface area per weight of the fine particles presumably promotes faster solid phase polymerization, albeit at the cost of larger crystallite sizes. In this regard, the heat treatment during the particle formation as taught by the aforementioned U.S. Pat. No. 4,165,420 results in crystallite sizes greater than about 9 nm. These Goodyear patents, however, fail to appreciate that solid state polymerizing prepolymer having a relatively large average crystallite size will result in resins that possesses unacceptably high melt temperatures.

In summary, the prior art discloses solid state methods of polymerizing low molecular weight polyester prepolymers to achieve high molecular weight polyester compositions. These methods, however, yield polyester compositions that possess unacceptably high haze points. Processing such polyester compositions through preform molding equipment at conventional temperature settings results in hazy bottles. Consequently, preform equipment must be operated at higher temperatures. This requires more cooling time, which slows process throughput as compared to conventional processes. Moreover, higher preform molding temperatures lead to high levels of polyethylene terephthalate decomposition products, such as acetaldehyde and color bodies. Therefore, there is a need for a high molecular weight copolyester bottle resin that can be polymerized primarily in the solid phase, and yet possesses excellent melt processing characteristics.

OBJECT AND SUMMARY OF THE INVENTION

Accordingly, it is an object of this invention to provide a cost-effective method of making a modified polyester bottle resin that has excellent properties with respect to melt extrusion, injection molding, and other kinds of melt processing.

In one aspect, the invention is a method of polymerizing copolyester prepolymer to yield high molecular weight copolyester possessing excellent melt processing properties. In contrast to most conventional processes, the present method relies more on solid state polymerization (SSP) and less upon melt polymerization to increase molecular weight. In contrast to other solid state processes, the present method yields a copolyester bottle resin that can be manufactured into essentially haze-free bottle preforms at significantly lower temperatures.

In another aspect, the invention is a low molecular weight copolyester prepolymer composition that is useful for producing higher molecular weight copolyester bottle resin having improved melt-processing characteristics. Preferably, the copolyester prepolymer composition is a modified polyethylene terephthalate prepolymer having an intrinsic viscosity between about 0.25 dl/g and 0.40 dl/g, and more preferably between about 0.30 dl/g and 0.36 dl/g. In yet another aspect, the invention is a high molecular weight copolyester bottle resin made from the low molecular weight copolyester prepolymer. This copolyester bottle resin has excellent melt processing characteristics. Preferably, the copolyester bottle resin is modified polyethylene terephthalate having an intrinsic viscosity of at least 0.70 dl/g.

The foregoing, as well as other objectives and advantages of the invention and the manner in which the same are accomplished, is further specified within the following detailed description and its accompanying drawing.

BRIEF DESCRIPTION OF THE DRAWINGS

FIG. 2 compares, on a volumetric basis, the percent crystallinity of a bottle resin prepared from low intrinsic viscosity prepolymers with a conventional bottle resin containing a similar fraction of total comonomer.

DETAILED DESCRIPTION

Figure 1:
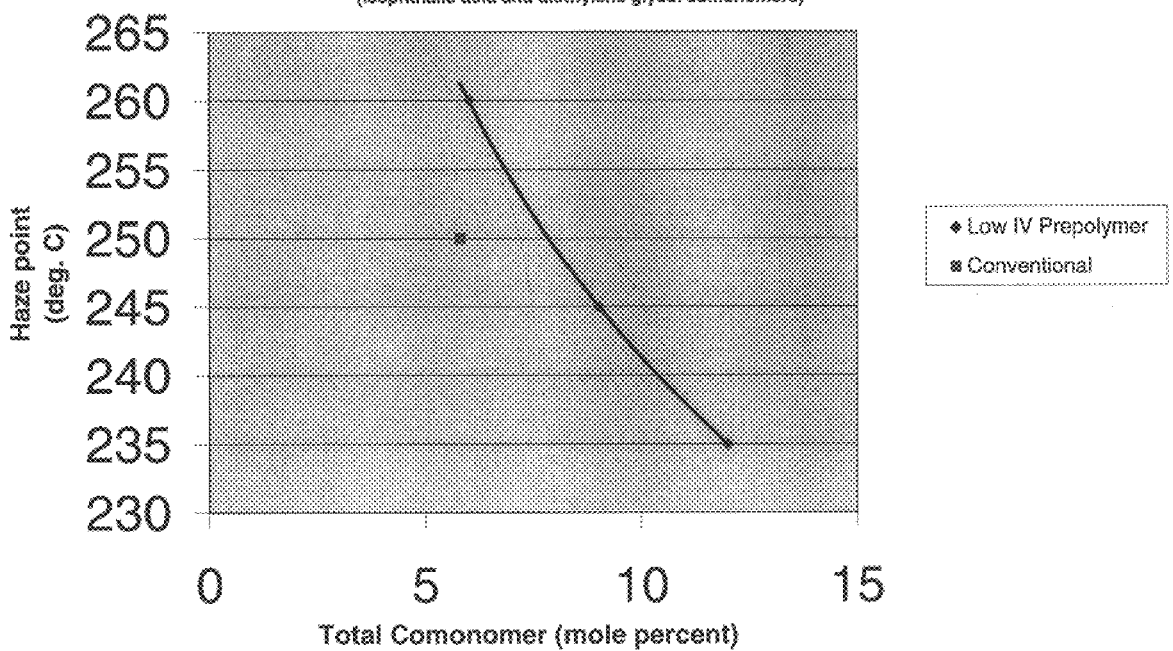
FIG. 1 compares the haze point of a bottle resin prepared from low intrinsic viscosity prepolymers with a conventional bottle resin containing a similar fraction of total comonomer.

The present invention is a method of preparing a high molecular weight copolyester bottle resin that has excellent melt processing characteristics. The method includes the steps of reacting a terephthalate component and a diol component to form a modified polyethylene terephthalate. In this regard, the terephthalate component and the diol component must together include at least 7 mole percent comonomer substitution. The modified polyethylene terephthalate is copolymerized in the melt phase to an intrinsic viscosity of between about 0.25 dl/g and 0.40 dl/g to thereby form a copolyester prepolymer having an average apparent crystallite size of less than 9 nm. With respect to this melt phase copolymerization, the target intrinsic viscosity of the prepolymer is preferably between about 0.30 dl/g and 0.36 dl/g. The copolyester prepolymer is then formed into chips, which are thereafter polymerized in the solid phase to form a high molecular weight bottle resin that has an intrinsic viscosity of at least about 0.70 dl/g and a solid phase density of less than 1.413 g/cc.

In one preferred embodiment, the step of reacting the terephthalate component and the diol component is further defined by the terephthalate component including at least about 4 mole percent diacid or diester comonomer with the remainder being terephthalic acid or its dialky ester, dimethyl terephthalate, and the diol component being present in excess of stoichiometric proportions and including at least about 2 mole percent diol comonomer with the remainder being ethylene glycol. More specifically, the terephthalate component preferably includes between about 90 and 96 mole percent terephthalic acid or dimethyl terephthalate and between about 4 and 10 mole percent diacid or diester comonomer, and the diol component preferably includes between about 94 and 98 mole percent ethylene glycol and between about 2 and 6 mole percent diol comonomer. It will be understood that diacid comonomer should be employed when the terephthalate component is mostly terephthalic acid, and diester comonomer should be employed when the terephthalate component is mostly dimethyl terephthalate.

According to the invention, it has been determined that the method yields a copolyester bottle resin that has excellent melt processing characteristics when the 4 to 10 mole percent diacid comonomer is a derivative of isophthalic acid, 2,6 naphthalene dicarboxylic acid, and succinic acid, and the 2 to 6 mole percent diol comonomer is diethylene glycol. In this respect, the term "derivative" refers to the compound itself, its anhydrides, and its dialkyl esters (e.g., succinic acid, its anhydride, or its dialkyl ester).

In another preferred embodiment, the step of reacting the terephthalate component and the diol component is further defined by the terephthalate component including essentially no diacid or diester comonomer—i.e., it is essentially 100 mole percent terephthalic acid or dimethyl terephthalic— and by the diol component including between about 84 and 94 mole percent ethylene glycol, between about 2 and 6 mole percent diethylene glycol, and between about 4 and 10 mole percent cyclohexane dimethanol.

In another aspect, the method of preparing a high molecular weight copolyester bottle resin further includes forming the high molecular weight bottle resin into bottle preforms. In this regard, the invention facilitates formation of the bottle resin chips into bottle preforms at a haze point temperature below 260° C., preferably below 250° C., more preferably below 240° C. (e.g., 235° C.).

In yet another aspect, the method of preparing a high molecular weight copolyester bottle resin includes copolymerizing the copolyester prepolymer chips in the solid phase to form a high molecular weight bottle resin having an average apparent crystallite size of 10 nm or less, and more preferably 9 nm or less.

The terms "melt viscosity" and "intrinsic viscosity" are used herein in their conventional sense. Melt viscosity represents the resistance of molten polymer to shear deformation or flow as measured at specified conditions. Melt viscosity is primarily a factor of intrinsic viscosity, shear, and temperature. As used herein, the term "melt viscosity" refers to "zero-shear melt viscosity" unless indicated otherwise.

Intrinsic viscosity is the ratio of the specific viscosity of a polymer solution of known concentration to the concentration of solute, extrapolated to zero concentration. Intrinsic viscosity is directly proportional to average polymer molecular weight. See, e.g., *Dictionary of Fiber and Textile Technology,* Hoechst Celanese Corporation (1990); Tortora & Merkel, *Fairchild's Dictionary of Textiles* ($7^{th}$ Edition 1996). As used herein, average molecular weight refers to number-average molecular weight, rather than weight-average molecular weight.

Both melt viscosity and intrinsic viscosity, which are widely recognized as standard measurements of polymer characteristics, can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0–63.5 grams) of orthochlorophenol at a temperature of about 105° C. Fiber and yarn samples are typically cut into small pieces, whereas chip samples are ground. After cooling to room temperature, the solution is placed in the viscometer and the relative viscosity is measured. As noted, intrinsic viscosity is calculated from relative viscosity. As discussed herein, all intrinsic viscosities relating to the invention are referenced to orthochlorophenol at 25° C.

The volume percent crystallinity of a polymer can be calculated from the density of the polymer by Equation 1:

$$V_C = (D_M - D_A) \div (D_C - D_A) \cdot 100\%, \qquad \text{Eq. 1}$$

wherein $V_C$=volume percent crystallinity $D_M$=measured polymer density $D_A$=100-percent amorphous polymer density $D_C$=100-percent crystalline polymer density The measured density is typically determined according to ASTM 1505–85 by employing a density gradient column that is calibrated using glass bead density standards. The 100-percent crystalline polymer density is estimated from the crystalline unit cell of the polymer and the amorphous density is measured from the amorphous polymer using a density gradient column. A 100-percent crystalline polyethylene terephthalate polymer has a generally-accepted calculated density of 1.455 grams/cc, and a 100-percent amorphous polyethylene terephthalate polymer has generally-accepted measured density of 1.333 grams/cc.

As will be understood by those having ordinary skill in the art, the amorphous density of polyethylene terephthalate is modified by the introduction of comonomer units. In this regard, the amorphous density of comonomer-modified polyethylene terephthalate can be calculated by the Equation 2:

$$1 \div D_A = ((1 - X_{CM}) \div D_{APET}) + (X_{CM} \div D_{ACM}), \qquad \text{Eq. 2}$$

wherein $D_A$=100-percent amorphous polymer density $X_{CM}$=weight fraction of comonomer unit $D_{APET}$=100-percent amorphous polyethylene terephthalate density $D_{ACM}$=100-percent amorphous polymer density of the polymer formed from the comonomer Thereafter, volume percent crystallinity for the comonomer-modified polyethylene terephthalate can be determined by Equation 1 (above) using $D_A$ as calculated from Equation 2 and using the 100-percent crystalline polymer density of polyethylene terephthalate (i.e., $D_C$=1.455 grams/cc).

With respect to isophthalic acid comonomer, the amorphous density of polyethylene isophthalate is reported to be 1.356 grams/cc. See Amoco Chemicals GTSR-123, "Modification of PET with Purified Isophthalic Acid." With respect to cyclohexane dimethanol comonomer, the amorphous density for polycyclohexane dimethylene terephthalate is reported to be 1.19 grams/cc. See H. Y. Yoo et al., *Polymer,* Vol. 35 at p.117 (1994). With respect to 2,6 naphthalene dicarboxylic acid comonomer, the amorphous density of polyethylene 2,6-napthalene dicarboxylate is 1.325 grams/cc. See Amoco Chemicals GTSR-H, "Strain Hardening Characteristics and Basic Properties of Naphthalate Containing Polyester Films." Finally, with respect to succinic acid comonomer, the amorphous density of polyethylene succinate is estimated to be 1.075 grams/cc. See J. Erandrup and E. H. Immergut, Polymer Handbook, ($3^{rd}$ Ed. 1989).

The apparent crystallite size was determined by X-ray powder diffractometry (XRD) using the procedure outlined in U.S. Pat. No. 5,714,262 with some minor modifications due to differences in instrumentation. The pellets were powdered in a mini-mill, and the powder was pressed into a disk 32 millimeters in diameter and approximately one millimeter thick. The disks were placed in XRD sample holders atop double-sided adhesive. The experiments were performed in a Scintag XDS 2000 diffractometer that unlike the Phillips instrument is designed to detect reflected X-rays rather than transmitted X-rays. The initial experiments included runs with the underside of the sample coated with a highly crystalline material (LaB6 or Si). There was no evidence that any of the Cu K-alpha X-rays penetrated completely through the sample to the underlying adhesive. No corrections were needed for the adhesive layer. The diffraction data was then collected from the rotated sample over the range 15° to 20° 2-theta using a step scan at 0.05°/step, a 65 sec/step acquisition time, and 1° slits. No curved beam monochrometer was used and the X-ray scan was run in step mode so a Lorenz-polarization correction was not necessary. The apparent crystallite size was calculated using the Sherrer equation on the 010 peak.

As used herein, the term "terephthalate component" refers to diacids and diesters that can be used to prepare polyethylene terephthalate. In particular, the terephthalate component mostly includes terephthalic acid (TA) and dimethyl terephthalate (DMT), but can include diacid and diester comonomers as well. In this regard, those having ordinary skill in the art will know that there are two conventional methods for forming polyethylene terephthalate. One method involves a two-step ester exchange reaction and polymerization using dimethyl terephthalate and excess ethylene glycol. The other method employs a direct esterification reaction using terephthalic acid and excess ethylene glycol. These methods are well known to those skilled in the art.

The present invention yields an intermediate, low molecular weight copolyester prepolymer that includes selective substitution of some terephthalic acid units with other diacid (or diester) monomers and selective substitution of some ethylene glycol units with other diol monomers. The diacid (or diester) and diol reactants are polymerized in the melt phase until the prepolymer achieves an intrinsic viscosity of between about 0.25 dl/g and 0.40 dl/g—more preferably an intrinsic viscosity of between about 0.30 dl/g and 0.36 dl/g—and an average apparent crystallite size of less than 9 nm. The reaction can be controlled using cobalt-based and antimony-based catalyst systems and phosphorous-based stabilizers. In preferred embodiments, the reactants are chosen to yield the following four preferred prepolymers:

(1) A low molecular weight copolyester prepolymer having a terephthalate component including between about 4 and 10 mole percent isophthalic acid or its dialkyl ester (i.e., dimethyl isophthalate) with the remainder being terephthalic acid or its dialkyl ester (ie., dimethyl terephthalate), and a diol component including between about 2 and 6 mole percent diethylene glycol with the remainder being ethylene glycol.

(2) A low molecular weight copolyester prepolymer having a terephthalate component including between about 4 and 10 mole percent 2,6 naphthalene dicarboxylic acid or its dialkyl ester (i.e., dimethyl 2,6 naphthalene dicarboxylate) with the remainder being terephthalic acid or its dialkyl ester (i.e., dimethyl terephthalate), and a diol component including between about 2 and 6 mole percent diethylene glycol with the remainder being ethylene glycol.

(3) A low molecular weight copolyester prepolymer having a terephthalate component including between about 4 and 10 mole percent succinic acid, its dialkyl ester (i.e., dimethyl succinate), or its anhydride (i.e., succinic anhydride) with the remainder being terephthalic acid or its dialkyl ester (i.e., dimethyl terephthalate), and a diol component including between about 2 and 6 mole percent diethylene glycol with the remainder being ethylene glycol.

(4) A low molecular weight copolyester prepolymer having a terephthalate component including about 100 mole percent terephthalic acid or its dialkyl ester (i.e., dimethyl terephthalate), and a diol component including between about 2 and 6 mole percent diethylene glycol and between about 4 and 10 mole percent cyclohexane dimethanol with the remainder being ethylene glycol.

Prior to the solid state polymerization step, the copolyester prepolymer composition is formed into discrete particles by conventional techniques (e.g., strand pelletization and hot-cut pelletization—drops from a vibrating plate die, or drops or pastillates from a rotating die or plate will not work within the intrinsic viscosity range of the invention.) Such discrete particles of modified polyethylene terephthalate prepolymer are further polymerized in the solid state from a low molecular weight (i.e., an intrinsic viscosity of between about 0.25 dl/g and 0.40 dl/g) to a high molecular weight (i.e., an intrinsic viscosity of at least about 0.70 dl/g). Moreover, the resulting high molecular weight bottle resin has a solid phase density of less than 1.413 g/cc, which corresponds to a crystallinity volume of less than about 65 percent. As will be understood by those of ordinary skill in the art, the resulting high molecular weight copolyester includes randomly substituted diacid and diol monomer units.

As disclosed previously, the invention achieves a high molecular weight copolyester bottle resin primarily via solid state polymerization. In contrast, most conventional processes depend mostly on melt phase polymerization to achieve high molecular weight. For example, a standard method for preparing polyethylene terephthalate bottle resin includes polymerizing polyethylene terephthalate, which is modified by about 2.8 mole percent isophthalic acid and 3.0 mole percent diethylene glycol, in the melt phase to an intrinsic viscosity of about 0.6 dl/g. Thereafter, the copolyester is further polymerized in the solid phase to a somewhat higher molecular weight (e.g., 0.7 dl/g). This kind of conventional process yields bottle resins that are suitable for standard blow molding equipment. Unfortunately, polymerizing copolyester resin in the melt phase to an intrinsic viscosity of about 0.6 dl/g requires a significant capital investment.

Accordingly, this invention reduces bottle resin investment costs by polymerizing copolyesters mostly in the solid phase rather than in the melt phase. This is accomplished by initially polymerizing a copolyester resin in the melt phase to an intrinsic viscosity between about 0.25 and 0.40 dl/g. Thereafter, the resulting polyester prepolymer is polymerized in the solid phase to the desired molecular weight (i.e., an intrinsic viscosity greater than about 0.70 dl/g).

While less expensive, employing solid state polymerization rather than melt phase polymerization seems to increase the crystallinity fraction of the resulting bottle resin. (This is indicated by an increase in density relative to conventionally produced polyester for a given composition). Unfortunately, higher crystallinity fraction adversely affects haze point (i.e., increases haze point temperature). Thus, all things being equal, beginning solid state polymerization of copolyester bottle resin at a lower intrinsic viscosity will cause the resulting bottle resin to possess a higher haze point. FIG. 1 shows that haze point increases when the solid state polymerization is initiated at lower intrinsic viscosities in accordance with the present invention as compared to conventional processes. Likewise, FIG. 2 shows that percent crystallinity increases when the solid state polymerization is initiated at lower intrinsic viscosities in accordance with the present invention as compared to conventional processes.

As will be understood by those having ordinary skill in the art, polyester in the amorphous state is clear, whereas polyester in the crystalline state—produced by thermal crystallization of the amorphous phase—tends to be cloudy. Heating polyester above its melting point and rapidly quenching it to a temperature below its glass transition temperature destroys crystallinity, thereby placing the copolyester in the amorphous state. Consequently, to obtain clear bottle preforms, it is imperative that melting and quenching put the bottle resin into a mostly amorphous state. (This is especially important given that reheating bottle resin in a blow-molding machine can promote crystallization.)

Therefore, a bottle resin possessing a low haze point is desirable because it requires less heating to achieve an amorphous state. A lower process temperature also means better heat transfer and, thus, faster process throughputs. Lower temperatures minimize the inadvertent production of unwanted decomposition by-products, too.

EXAMPLE 1

| Copolyester | SSP Starting I.V. | Bottle Resin I.V. | Crystallinity volume % | Haze Point (° C.) | Density (g/cc) |
|---|---|---|---|---|---|
| (A) PET (2.8 mol % IPA and 3.0 mol % DEG) (conventional) | 0.6 dl/g | 0.81 dl/g | 55 | 250 | 1.3988 |
| (B) PET (3.0 mol % IPA and 3.0 mol % DEG) | 0.3 dl/g | 0.81 dl/g | 67 | 260 | 1.4151 |

Example 1 (above) illustrates that initiating solid state polymerization at a lower intrinsic viscosity tends to increase crystallinity fraction and, thus, haze point temperature. This is so even though the copolyester (B) polymerized in the solid phase starting at about 0.3 dl/g had a somewhat higher comonomer fraction as compared to the conventionally polymerized copolyester (A). Ordinarily, a higher comonomer substitution should disrupt crystallinity, thus depressing haze point. That is, all things being equal, lower—not higher—comonomer molar fractions should result in the formation of more perfect crystalline structures during solid phase polymerization and, hence, higher haze points. Here, however, the composition with the higher substitution (B) has a higher crystallinity volume and higher haze point. This appears to be a result of initiating solid state polymerization at a lower intrinsic viscosity.

Other methods of producing bottle resins by primarily relying on solid state polymerization can increase solid phase polymerization rate. These methods, however, have failed to appreciate the effect solid state polymerization has upon crystallinity fraction and haze point. Accordingly, such methods produce bottle resins having high melting points. This demands that standard equipment achieve higher melt temperatures during molding to facilitate haze-free production of bottle preforms. In short, solid state polymerization requires less capital cost, but ultimately yields resins that are difficult to process through convention equipment.

To overcome this haze point problem caused by high crystallinity, the present invention increases the comonomer fraction as compared to conventional resins, such as that disclosed in Example 1, when initiating SSP at a lower prepolymer intrinsic viscosity. As discussed earlier, it is believed that higher comonomer substitution, while somewhat slowing solid state polymerization, advantageously reduces crystallite formation.

EXAMPLE 2

Polyester prepolymer with 3 mole percent isophthalic acid and intrinsic viscosity between 0.30 and 0.35.

Terephthalic acid, 41.71 kg, isophthalic acid, 1.29 kg, ethylene glycol, 17.58 kg, diethylene glycol, 0.08 kg, a 20% solution of cobalt acetate tetrahydrate in water, 26.4 g, and 1.3% antimony oxide in ethylene glycol, 1150.6 g, were blended together to make a paste. This paste was transferred to an esterification vessel heated to between 260° C. and 270° C. and pressurized to 3 bar. The overhead system in the vessel column separated and removed water produced during esterification from glycol, and the glycol was returned to the esterification vessel. The initial esterification batch provided a hot reactor heel to which more paste was added to the esterification vessel for efficient esterification. After the extent of esterification reached 98% and the pressure in the reactor was reduced to 1 bar, 52.7 kilograms of ester was transferred to a polycondensation vessel. After the transfer, 31.6 grams of a 10% phosphoric acid solution was added to the ester, the pressure in the polycondensation vessel was reduced to less than 1 mbar and the temperature in the vessel was increased to 285° C. After a polycondensation time of 65 to 70 minutes, the vessel was brought to atmospheric pressure. The product was extruded and quenched in a water bath as an amorphous strand, and then cut into pellets.

EXAMPLE 3

Polyester prepolymer with 6.0 mole percent isophthalic acid and intrinsic viscosity between 0.33 and 0.36.

Terephthalic acid, 40.42 kg, isophthalic acid, 2.58 kg, ethylene glycol, 17.58 kg, diethylene glycol, 0.08 kg, 20% solution of cobalt acetate tetrahydrate in water, 26.4 g, and 1.3% antimony oxide in ethylene glycol, 1150.6 g, were blended together to make a paste. This paste was transferred to an esterification vessel heated to between 260° C. and 270° C. and pressurized to 3 bar. The overhead system in the vessel column separated and removed water produced during esterification from glycol, and the glycol was returned to the esterification vessel. The initial esterification batch provided a hot reactor heel to which more paste was added to the esterification vessel for efficient esterification. After the extent of esterification reached 98% and the pressure in the reactor was reduced to 1 bar, 52.7 kilograms of ester was transferred to a polycondensation vessel. After the transfer, 31.6 grams of a 10% phosphoric acid solution was added to the ester, the pressure in the polycondensation vessel was reduced to less than 1 mbar and the temperature in the vessel was increased to 285° C. After a polycondensation time of 65 to 70 minutes, the vessel was brought to atmospheric pressure. The product was extruded and quenched in a water bath as an amorphous strand, and then cut into pellets.

EXAMPLE 4

Polyester prepolymer with 9.0 mole percent isophthalic acid and intrinsic viscosity between 0.30 and 0.32.

Terephthalic acid, 39.13 kg, isophthalic acid, 3.87 kg, ethylene glycol, 17.58 kg, diethylene glycol, 0,08 kg, 20% solution of cobalt acetate tetrahydrate in water, 26.4 g, and 1.3% antimony oxide in ethylene glycol, 1150.6 g, were blended together to make a paste. This paste was transferred to an esterification vessel heated to between 260° C. and 270° C. and pressurized to 3 bar. The overhead system in the vessel column separated and removed water produced during esterification from glycol, and the glycol was returned to the esterification vessel. The initial esterification batch provided a hot reactor heel to which more paste was added to the esterification vessel for efficient esterification. After the extent of esterification reached 98% and the pressure in the reactor was reduced to 1 bar, 52.7 kilograms of ester was transferred to a polycondensation vessel. After the transfer, 31.6 grams of a 10% phosphoric acid solution was added to the ester, the pressure in the polycondensation vessel was reduced to less than 1 mbar and the temperature in the vessel was increased to 285° C. After a polycondensation time of 65 to 70 minutes, the vessel was brought to atmospheric pressure. The product was extruded and quenched in a water bath as an amorphous strand, and then cut into a pellet.

EXAMPLE 5 (COMPARATIVE)

Polyester prepolymer with 6.0 mole percent adipic acid and intrinsic viscosity between 0.32 and 0.36.

Terephthalic acid, 40.24 kg, adipic acid, 2.27 kg, ethylene glycol, 17.58 kg, diethylene glycol, 0,08 kg, 20% solution of cobalt acetate tetrahydrate in water, 26.4 g, and 1.3% antimony oxide in ethylene glycol, 1150.6 g, were blended together to make a paste. This paste was transferred to an esterification vessel heated to between 260° C. and 270° C. and pressurized to 3 bar. The overhead system in the vessel column separated and removed water produced during esterification from glycol, and the glycol was returned to the esterification vessel. The initial esterification batch provided a hot reactor heel to which more paste was added to the esterification vessel for efficient esterification. After the extent of esterification reached 98% and the pressure in the reactor was reduced to one bar, 52.7 kilograms of ester was transferred to a polycondensation vessel. After the transfer, 31.6 grams of a 10% phosphoric acid solution was added to the ester, the pressure in the polycondensation vessel was reduced to less than 1 mbar and the temperature in the vessel was increased to 285° C. After a polycondensation time of 65 to 70 minutes, the vessel was brought to atmospheric pressure. The product was extruded and quenched in a water bath as an amorphous strand and cut into a pellet. (This example shows that some comonomer modifiers are less effective at disrupting crystallinity relative to other comonomer modifiers, such as isophthalic acid.)

EXAMPLE 6

Polyester prepolymer with 6.0 mole percent cyclohexane dimethanol (CHDM) and intrinsic viscosity between 0.32 and 0.36.

Terephthalic acid, 43.00 kg, ethylene glycol, 16.60 kg, cyclohexane dimethanol, 2.24 kg, diethylene glycol, 0,08 kg, 20% solution of cobalt acetate tetrahydrate in water, 26.4 g, and 1.3% antimony oxide in ethylene glycol, 1150.6 g, were blended together to make a paste. This paste was transferred to an esterification vessel heated to between 260° C. and 270° C. and pressurized to 3 bar. The overhead system in the vessel column separated and removed water produced during esterification from glycol, and the glycol was returned to the esterification vessel. The initial esterification batch provided a hot reactor heel to which more paste was added to the esterification vessel for efficient esterification. After the extent of esterification reached 98% and the pressure in the reactor was reduced to 1 bar, 52.7 kilograms of ester was transferred to a polycondensation vessel. After the transfer, 31.6 grams of a 10% phosphoric acid solution was added to the ester, the pressure in the polycondensation vessel was reduced to less than 1 mbar and the temperature in the vessel was increased to 285° C. After a polycondensation time of 65 to 70 minutes, the vessel was brought to atmospheric pressure. The product was extruded and quenched in a water bath as an amorphous strand, and then cut into a pellets.

EXAMPLE 7

The copolyester prepolymer, 200 kg ,containing 3 mole percent isophthalate from Example 2 was blended together in a rotary-vacuum tumble dryer for solid state polymerization. The copolyester was heated in the tumble dryer to 227.5° C. with a vacuum of less than 1 millibar. After 54 hours under these conditions, the copolyester had a final intrinsic viscosity of 0.81 dl/g and a density of 1.4151 g/cc, which corresponds to a volume percent crystallinity of 67.1 percent. The apparent crystal size was 8.2 nm, as determined by powder X-ray diffraction.

EXAMPLE 8

The copolyester prepolymer, 200 kg, containing 6 mole percent isophthalate from Example 3 was blended together in a rotary-vacuum tumble dryer for solid state polymerization. The copolyester was heated in the tumble dryer to 226° C. with a vacuum of less than 1 millibar. After 40 hours under these conditions, the copolyester had a final intrinsic viscosity of 0.81 dl/g and a density of 1.4124 g/cc, which corresponds to a volume percent crystallinity of 64.7 percent. The apparent crystal size was 9.1 nm, as determined by powder X-ray diffraction.

EXAMPLE 9

The copolyester prepolymer, 150 kg, containing 9 mole percent isophthalate from Example 4 were blended together in a rotary-vacuum tumble dryer for solid state polymerization. The copolyester was heated in the tumble dryer to 225° C. with a vacuum of less than 1 millibar. After 79 hours under these conditions, the copolyester had a final intrinsic viscosity of 0.81 dl//g and a density of 1.4008 g/cc, which corresponds to a volume percent crystallinity of 54.8 percent. The apparent crystal size was 9.2 nm, as determined by powder X-ray diffraction.

EXAMPLE 10 (COMPARATIVE)

The copolyester prepolymer, 200 kg, containing 6 mole percent adipate from Example 5 was blended together in a rotary-vacuum tumble dryer for solid state polymerization. The copolyester was heated in the tumble dryer to 225° C. with a vacuum of less than 1 millibar. After 60 hours under these conditions, the copolyester had a final intrinsic viscosity of 0.81 dl/g and a density of 1.4126 g/cc, which corresponds to a volume percent crystallinity of 65.0 percent. The apparent crystal size was 8.7 nm, as determined by powder X-ray diffraction.

EXAMPLE 11

The copolyester prepolymer, 200 kg, containing 6 mole percent cyclohexane dimethanol from Example 6 was blended together in a rotary-vacuum tumble dryer for solid state polymerization. The copolyester was heated in the tumble dryer to 229° C. with a vacuum of less than 1 millibar. After 45 hours under these conditions, the copolyester had a final intrinsic viscosity of 0.80 dl/g and a density of 1.3945 g/cc, which corresponds to a volume percent crystallinity of 55.2 percent. The apparent crystal size was 8.6 nm, as determined by powder X-ray diffraction.

EXAMPLE 12

| Copolyester | Prepolymer I.V. | Crystallization temperature (° C.) | Crystallization time (hours) | Apparent Crystallite Size (nm) |
|---|---|---|---|---|
| polyethylene terephthalate (2.8 mol % IPA and 3.0 mol % DEG) (conventional) | 0.6 dl/g | 180 | 2 | 7.0 |

-continued

| Copolyester | Pre-polymer I.V. | Crystallization temperature (° C.) | Crystallization time (hours) | Apparent Crystallite Size (nm) |
|---|---|---|---|---|
| polyethylene terephthalate (3.0 mol % IPA and 3.0 mol % DEG) | 0.3 dl/g | 180 | 4 | 7.3 |
| polyethylene terephthalate (6.0 mol % IPA and 3.0 mol % DEG) | 0.3 dl/g | 180 | 4 | 7.5 |
| polyethylene terephthalate (9.0 mol % IPA and 3.0 mol % DEG) | 0.3 dl/g | 180 | 4 | 8.3 |
| polyethylene terephthalate (6.0 mol % adipic acid and 3.0 mol % DEG | 0.3 dl/g | 180 | 4 | 8.0 |
| polyethylene terephthalate (6.0 mol % CHDM and 2.7 mol % DEG) | 0.3 dl/g | 180 | 4 | 6.2 |

Example 12 (above) illustrates the effect of crystallization conditions on copolyester prepolymer crystal size. In contrast to the method described in the aforementioned DuPont patents, the present invention employs much longer crystallization times. Without being bound to a particular theory, it is believed that polymer crystallization starting from lower temperature and longer crystallization times promote the formation of more nuclei, which results in relatively smaller crystallite size.

EXAMPLE 13

| Copolyester | SSP Starting I.V. | Bottle Resin I.V. | Crystallinity volume % | Haze Point (° C.) | Apparent Crystallite Size (nm) | Density (g/cc) |
|---|---|---|---|---|---|---|
| polyethylene terephthalate (2.8 mol % IPA and 3.0 mol % DEG) (conventional) | 0.6 dl/g | 0.81 dl/g | 55 | 250 | 8.0 | 1.3988 |
| polyethylene terephthalate (3.0 mol % IPA and 3.0 mol % DEG) | 0.3 dl/g | 0.81 dl/g | 67 | 260 | 8.2 | 1.4151 |
| polyethylene terephthalate (6.0 mol % IPA and 3.0 mol % DEG) | 0.3 dl/g | 0.81 dl/g | 65 | 245 | 9.1 | 1.4124 |
| polyethylene terephthalate (9.0 mol % IPA and 3.0 mol % DEG) | 0.3 dl/g | 0.81 dl/g | 55 | 235 | 9.2 | 1.4008 |
| polyethylene terephthalate (6.0 mol % adipic acid and 3.0 mol % DEG | 0.3 dl/g | 0.81 dl/g | 65 | 255 | 8.6 | 1.4126 |
| polyethylene terephthalate (6.0 mol % CHDM and 2.7 mol % DEG) | 0.3 dl/g | 0.80 dl/g | 55 | 240 | 8.7 | 1.3945 |

Example 13 (above) illustrates that despite initiating SSP at a low intrinsic viscosity, the invention produces bottle resins with melt characteristics that are equal or better to those of bottle resins produced by conventional techniques.

The theoretical mechanism for this improved melt processing behavior is not completely understood, but may be related to the crystalline morphology of the copolyester compositions in the solid phase. It is believed that the addition of relatively high fractions of certain kinds of comonomer disrupts polymer crystallinity. This permits the polyester to be melted and extruded at a lower temperature while completely destroying the molded preform haze that is associated with thermal crystallinity. In this regard, it has been observed that adipic acid does not seem to disturb crystallinity as copolyester bottle resin primarily modified with adipic acid has a relatively high haze point. Alternatively, the theoretical mechanism for this improved melt processing behavior may also be related to the crystallization rate of these copolyester compositions while in the melt phase.

As noted, an objective of the invention is to produce a high molecular weight bottle resin that can be readily processed using convention equipment. In this regard, it is instructive to compare the copolyester composition of the present invention with a conventional copolyester bottle resin. A polyethylene terephthalate bottle resin modified by about 5 mole percent isophthalic acid or its dialkyl ester (i.e., dimethyl isophthalate) and 3 mole percent diethylene glycol and melt polymerized to an intrinsic viscosity of only about 0.32 dl/g prior to being polymerized in the solid phase will possess melt processing characteristics similar to those of a conventional polyethylene terephthalate bottle resin modified by about 2.8 mole percent isophthalic acid and 3.0 mole percent diethylene glycol and melt polymerized up to 0.6 dl per gram prior to being polymerized in the solid phase:

EXAMPLE 14

| Copolyester | SSP Starting I.V. | Bottle Resin I.V. | Crystallinity mole % | Haze Point (° C.) |
|---|---|---|---|---|
| PET (2.8 mol % IPA, 3.0 mol % DEG) (conventional) | 0.6 dl/g | 0.80 dl/g | 55 | 250 |
| PET (5.0 mol % IPA, 3.0 mol % DEG) | 0.32 dl/g | 0.80 dl/g | 65 | 250 |

It is reemphasized that the copolyester of the present invention is produced by a process (i.e., primary reliance on SSP) that requires significantly less capital investment. Accordingly, a major benefit of the present invention is the ability to produce bottle resins that perform at least as well as conventional bottle resins, while lowering required capital expenditures.

In direct contrast to the cited DuPont prior art, which teaches solid state polymerization of polyester prepolymer having large apparent crystallite size in the prepolymer, this invention reduces the negative impact of crystallinity upon haze point temperature by employing smaller crystals in the prepolymer (i.e., less than 9 nm). More specifically, according to the invention, it has been determined that while larger crystal sizes in the prepolymer (i.e., 9 nm or more) appear to speed solid state polymerization steps by facilitating higher SSP temperatures, larger crystals negatively affect bottle resin characteristics. In particular, bottle resins having larger crystal sizes process poorly because they possess elevated haze point temperatures. This is especially true when such bottle resins have a comonomer substitution of less than about five weight percent isophthalic acid, or a similarly effective comonomer.

While not wanting to be bound by any particular theory, it is believed that crystalline polymers comprised of smaller crystals melt at lower temperatures as compared to resins comprised of larger crystals. Although smaller crystals may somewhat slow solid phase polymerization, the resulting bottle resins are capable of formation into preforms at a lower haze point. As a practical matter, this simply means that the present invention actually achieves a bottle resin that can be processed through conventional injection molding conditions and equipment.

In another aspect, the invention is bottle resin chips of a high molecular weight copolyester having excellent melt processing characteristics. The copolyester chips comprises about a 1:1 molar ratio of a terephthalate component and a diol component. The terephthalate component and the diol component together include at least 7 mole percent comonomer. In addition, the copolyester chips have an average minimum dimension (i.e., the shortest side of the chip) of between about 1 mm and 10 mm, and possess an intrinsic viscosity of at least about 0.70 dl/g, a solid phase density of less than 1.413 g/cc, an average apparent crystallite size of less than 9 nm, and a haze temperature of less than about 250° C.

Note that these copolyester chips are significantly larger than the spherical beads and porous pills disclosed by the aforementioned Goodyear patents. In fact, the particle sizes disclosed by those patents (<1 mm) are essentially fines with respect to the present copolyester chips.

As will be understood by those of ordinary skill in the art, the diol component usually forms the majority of terminal ends of the polymer chains and so is present in the composition in slightly greater fractions. This is what is meant by the phrase "about a 1:1 molar ratio of a terephthalate component and a diol component," as used herein. For example, the molar ratio of the terephthalate component and the diol component is between about 1.000:1.010 and 1.000:1.005.

In one embodiment of the bottle resin chips, the terephthalate component includes at least about 4 mole percent diacid or diester comonomer with the remainder being terephthalic acid or dimethyl terephthalate, and the diol component includes at least about 2 mole percent diol comonomer with the remainder being ethylene glycol. More specifically, the terephthalate component preferably includes between about 90 and 96 mole percent terephthalic acid or dimethyl terephthalate and between about 4 and 10 mole percent diacid or diester comonomer; and the diol component includes between about 94 and 98 mole percent ethylene glycol and between about 2 and 6 mole percent diol comonomer.

In this formulation, the bottle resin chips preferably have a solid phase density of between 1.401 grams/cc and 1.413 grams/cc, which is greater than the density of bottle resins produced according to conventional methods (i.e., those that rely primarily on melt phase polymerization to produce polyester resins), and less than the density of bottle resins produced according to other previously cited methods that emphasize in the solid phase polymerization rather than the melt phase polymerization.

In one preferred embodiment, the high molecular weight copolyester bottle resin chips have a terephthalate component including between about 4 and 10 mole percent isophthalic acid or its dialkyl ester (i.e., dimethyl isophthalate) with the remainder being terephthalic acid or its dialkyl ester (i.e., dimethyl terephthalate), and a diol component including between about 2 and 6 mole percent diethylene glycol with the remainder being ethylene glycol.

In another preferred embodiment, the high molecular weight copolyester bottle resin chips have a terephthalate component including between about 4 and 10 mole percent 2,6 naphthalene dicarboxylic acid or its dialkyl ester (i.e., dimethyl 2,6-naphthalene dicarboxylate) with the remainder being terephthalic acid or its dialkyl ester (i.e., dimethyl terephthalate), and a diol component including between about 2 and 6 mole percent diethylene glycol with the remainder being ethylene glycol.

In another preferred embodiment, the high molecular weight copolyester bottle resin chips have a terephthalate component including between about 4 and 10 mole percent succinic acid, its dialkyl ester (i.e., dimethyl succinate), or its anhydride (i.e., succinic anhydride) with the remainder being terephthalic acid or its dialkyl ester (i.e., dimethyl terephthalate), and a diol component including between about 2 and 6 mole percent diethylene glycol with the remainder being ethylene glycol.

In another preferred embodiment, the high molecular weight copolyester bottle resin chips have a terephthalate component including about 100 mole percent terephthalic acid or its dialkyl ester (i.e., dimethyl terephthalate) and essentially no diacid or diester comonomer, and a diol component including between about 2 and 6 mole percent diethylene glycol and between about 4 and 10 mole percent cyclohexane dimethanol with the remainder being ethylene glycol. In this particular formulation, the bottle resin chips have a solid phase density of between 1.390 grams/cc and 1.413 grams/cc In another embodiment, the copolyester bottle resin chips comprise about a 1:1 molar ratio of a terephthalate component and a diol component. The terephthalate component includes at least about 9 mole percent isophthalic acid or its dialkyl ester (i.e., dimethyl isophthalate) with the remainder being terephthalic acid or its dialkyl ester (i.e., dimethyl terephthalate), and the diol component includes at least about 2 mole percent diethylene glycol with the remainder being ethylene glycol. In addition, the copolyester chips have an average minimum dimension of between about 1 mm and 10 mm, and possess an intrinsic viscosity of at least about 0.80 dl/g, a solid phase density between 1.390 grams/cc and 1.413 grams/cc, an average apparent crystallite size of less than 10 nm, and a haze temperature of less than about 240° C.

The excellent melt processing characteristics of these high molecular weight copolyester bottle resins is somewhat surprising because they have much higher crystallinity as compared to conventionally produced copolyester having a similar comonomer fraction. One of ordinary skill in the art would expect the high crystallinity of these copolyester compositions to complicate melt extrusion. Instead, the high molecular weight copolyester compositions possess improved melt processing properties. It appears that a high crystallinity, which tends to increase haze point, is not problematic when the apparent crystallite size is kept below about 9 nm.

The disclosed copolyester compositions are especially useful as bottle resins because they can be manufactured into haze-free bottle preforms at low temperatures. Forming preforms at lower temperatures reduces the creation of unwanted byproducts, such as aldehydes and color bodies. As will be known to those skilled in the art, aldehydes, even at low concentrations, adversely affect bottle taste. Color bodies affect the aesthetics of the bottles produced from the preforms and is commercially undesirable for color control. Moreover, as discussed previously, lower melt temperatures promote efficient heat transfer.

In the drawings and the specification, typical embodiments of the invention have been disclosed. Specific terms have been used only in a generic and descriptive sense, and not for purposes of limitation. The scope of the invention is set forth in the following claims.

That which is claimed is:

1. A method of preparing a high molecular weight copolyester bottle resin that has excellent melt processing characteristics, comprising:

reacting a terephthalate component and a diol component to form a modified polyethylene terephthalate, wherein the terephthalate component includes at least about 4 mole percent diacid or diester comonomer with the remainder being terephthalic acid or dimethyl terephthalate, and the diol component is present in excess of stoichiometric proportions and includes at least about 2 mole percent diol comonomer with the remainder being ethylene glycol;

thereafter copolymerizing the modified polyethylene terephthalate in the melt phase to an intrinsic viscosity of between about 0.25 dl/g and 0.40 dl/g to thereby form a copolyester prepolymer having an average apparent crystallite size of less than 9 nm;

thereafter forming the copolyester prepolymer into chips; and thereafter polymerizing the copolyester prepolymer chips in the solid phase to form a high molecular weight bottle resin with an intrinsic viscosity of at least about 0.70 dl/g and a solid phase density of less than 1.413 g/cc.

2. A method of preparing a high molecular weight copolyester bottle resin according to claim 1, wherein:

the terephthalate component includes between about 90 and 96 mole percent terephthalic acid or dimethyl terephthalate and between about 4 and 10 mole percent diacid or diester comonomer; and the diol component includes between about 94 and 98 mole percent ethylene glycol and between about 2 and 6 mole percent diol comonomer.

3. A method of preparing a high molecular weight copolyester bottle resin according to claim 2, wherein:

the diacid or diester comonomer is isophthalic acid or its dialkyl ester; and the diol comonomer is diethylene glycol.

4. A method of preparing a high molecular weight copolyester bottle resin according to claim 3, wherein the step of copolymerizing the modified polyethylene terephthalate in the melt phase comprises copolymerizing the modified polyethylene terephthalate in the melt phase to an intrinsic viscosity of between about 0.30 dl/g and 0.36 dl/g.

5. A method of preparing a high molecular weight copolyester bottle resin according to claim 2, wherein:

the diacid or diester comonomer is 2,6 naphthalene dicarboxylic acid or its dialkyl ester; and the diol comonomer is diethylene glycol.

6. A method of preparing a high molecular weight copolyester bottle resin according to claim 5, wherein the step of copolymerizing the modified polyethylene terephthalate in the melt phase comprises copolymerizing the modified polyethylene terephthalate in the melt phase to an intrinsic viscosity of between about 0.30 dl/g and 0.36 dl/g.

7. A method of preparing a high molecular weight copolyester bottle resin according to claim 2, wherein:

the diacid or diester comonomer is succinic acid, its anhydride, or its dialkyl ester; and the diol comonomer is diethylene glycol.

8. A method of preparing a high molecular weight copolyester bottle resin according to claim 7, wherein the step of copolymerizing the modified polyethylene terephthalate in the melt phase comprises copolymerizing the modified polyethylene terephthalate in the melt phase to an intrinsic viscosity of between about 0.30 dl/g and 0.36 dl/g.

9. A method of preparing a high molecular weight copolyester bottle resin according to claim 1, wherein the step of polymerizing the copolyester prepolymer chips comprises copolymerizing the copolyester prepolymer chips in the solid phase to form a high molecular weight bottle resin having an average apparent crystallite size of 10 nm or less.

10. A method of preparing a high molecular weight copolyester bottle resin according to claim 9, wherein the high molecular weight bottle resin has an average apparent crystallite size of 9 nm or less.

11. A method of preparing a high molecular weight copolyester bottle resin according to claim 1, wherein the step of copolymerizing the modified polyethylene terephthalate in the melt phase comprises copolymerizing the modified polyethylene terephthalate in the melt phase to an intrinsic viscosity of between about 0.30 dl/g and 0.36 dl/g to thereby form a copolyester prepolymer.

12. A method of preparing a high molecular weight copolyester bottle resin according to claim 1, further comprising forming the high molecular weight bottle resin into bottle preforms.

13. A method of preparing a high molecular weight copolyester bottle resin according to claim 12, wherein the step of forming bottle preforms comprises forming the high molecular weight bottle resin into bottle preforms at a haze temperature below 260° C.

14. A method of preparing a high molecular weight copolyester bottle resin according to claim 13, wherein the step of forming bottle preforms comprises forming the high molecular weight bottle resin into bottle preforms at a haze temperature below 250° C.

15. A method of preparing a high molecular weight copolyester bottle resin according to claim 14, wherein the step of forming bottle preforms comprises forming the high molecular weight bottle resin into bottle preforms at a haze temperature below 240° C.

16. A method of preparing a high molecular weight copolyester bottle resin that has excellent melt processing characteristics, comprising:

reacting a terephthalate component and a diol component to form a modified polyethylene terephthalate, wherein the terephthalate component includes at least about 90 mole percent terephthalic acid, the diol component is present in excess of stoichiometric proportions and includes at least about 2 mole percent diol comonomer with the remainder being ethylene glycol; and the terephthalate component and the diol component together include at least 7 mole percent comonomer substitution;

thereafter copolymerizing the modified polyethylene terephthalate in the melt phase to an intrinsic viscosity of between about 0.25 dl/g and 0.40 dl/g to thereby form a copolyester prepolymer having an average apparent crystallite size of less than 9 nm;

thereafter forming the copolyester prepolymer into chips;

thereafter polymerizing the copolyester prepolymer chips in the solid phase to form a high molecular weight bottle resin, wherein the bottle resin has an intrinsic viscosity of at least about 0.70 dl/g and a solid phase density of less than 1.413 g/cc; and forming the high molecular weight bottle resin into bottle preforms at a haze temperature below 260° C.

17. A method of preparing a high molecular weight copolyester bottle resin according to claim 16, wherein the step of copolymerizing the modified polyethylene terephthalate in the melt phase comprises copolymerizing the modified polyethylene terephthalate in the melt phase to an intrinsic viscosity of between about 0.30 dl/g and 0.36 dl/g.

18. Bottle resin chips of a high molecular weight copolyester having excellent melt processing characteristics, comprising:

about a 1:1 molar ratio of a terephthalate component and a diol component, said terephthalate component including at least about 4 mole percent diacid or diester comonomer with the remainder being terephthalic acid or dimethyl terephthalate, and said diol component including at least about 2 mole percent diol comonomer with the remainder being ethylene glycol;

an intrinsic viscosity of at least about 0.70 dl/g;

a solid phase density of between 1.401 and 1.413 grams/cc;

an average apparent crystallite size of less than 9 nm;

a haze temperature of less than about 250° C.; and wherein said bottle resin chips have an average minimum dimension of between about 1 mm and 10 mm.

19. A high molecular weight copolyester bottle resin according to claim 18, wherein:

the terephthalate component includes between about 90 and 96 mole percent terephthalic acid or dimethyl terephthalate and between about 4 and 10 mole percent diacid or diester comonomer; and the diol component includes between about 94 and 98 mole percent ethylene glycol and between about 2 and 6 mole percent diol comonomer.

20. A high molecular weight copolyester bottle resin according to claim 19, wherein:

the diacid or diester comonomer is isophthalic acid or its dialkyl ester; and the diol comonomer is diethylene glycol.

21. A high molecular weight copolyester bottle resin according to claim 19, wherein:

the diacid or diester comonomer is 2,6 naphthalene dicarboxylic acid or its dialkyl ester; and the diol comonomer is diethylene glycol.

22. A high molecular weight copolyester bottle resin according to claim 19, wherein:

the diacid or diester comonomer is succinic acid, its anhydride, or its dialkyl ester; and the diol comonomer is diethylene glycol.

23. Bottle resin chips of a high molecular weight copolyester having excellent melt processing characteristics, comprising:

about a 1:1 molar ratio of a terephthalate component and a diol component, said terephthalate component including at least about 9 mole percent isophthalic acid or its dialkyl ester with the remainder being terephthalic acid or dimethyl terephthalate, and said diol component including at least about 2 mole percent diethylene glycol with the remainder being ethylene glycol;

an intrinsic viscosity of at least about 0.80 dl/g;

a solid phase density of between 1.390 and 1.413 grams/cc;

an average apparent crystallite size of less than 10 nm;

a haze temperature of less than about 240° C.; and wherein said bottle resin chips have an average minimum dimension of between about 1 mm and 10 mm.

* * * * *